United States Patent
Lee et al.

(10) Patent No.: US 11,017,378 B2
(45) Date of Patent: May 25, 2021

(54) ELECTRONIC DEVICE FOR DISPLAYING INFORMATION AND METHOD THEREOF

(71) Applicant: Samsung Electronics Co., Ltd., Gyeonggi-do (KR)

(72) Inventors: Yoon Ho Lee, Incheon (KR); Hyun Kim, Seoul (KR); Byung In Yu, Seoul (KR)

(73) Assignee: Samsung Electronics Co., Ltd

( * ) Notice: Subject to any disclaimer, the term of this patent is extended or adjusted under 35 U.S.C. 154(b) by 213 days.

(21) Appl. No.: 16/035,084

(22) Filed: Jul. 13, 2018

(65) Prior Publication Data
US 2019/0019177 A1     Jan. 17, 2019

(30) Foreign Application Priority Data
Jul. 13, 2017    (KR) ................. 10-2017-0089100

(51) Int. Cl.
*G06F 21/31*     (2013.01)
*G06Q 20/32*     (2012.01)
(Continued)

(52) U.S. Cl.
CPC ......... *G06Q 20/3255* (2013.01); *G06F 3/041* (2013.01); *G06F 3/048* (2013.01);
(Continued)

(58) Field of Classification Search
CPC .. G06F 21/31; G06F 21/32; G06F 2221/2113; G06F 3/041; G06F 3/048; H04W 12/06; H04L 63/105
See application file for complete search history.

(56) References Cited

U.S. PATENT DOCUMENTS

| | | | |
|---|---|---|---|
| 8,838,071 B1 | 9/2014 | Cronin | |
| 9,117,067 B2 * | 8/2015 | Ota | .............. G06F 21/32 |

(Continued)

FOREIGN PATENT DOCUMENTS

| | | |
|---|---|---|
| CN | 102778996 | 11/2012 |
| CN | 103793636 | 5/2014 |

(Continued)

OTHER PUBLICATIONS

International Search Report dated Oct. 29, 2018 issued in counterpart application No. PCT/KR2018/007993, 12 pages.
(Continued)

*Primary Examiner* — Thaddeus J Plecha
(74) *Attorney, Agent, or Firm* — The Farrell Law Firm, P.C.

(57) ABSTRACT

An electronic device is provided. The electronic device includes a display configured to display information, an input device configured to receive a user input, an image sensor, a processor electrically connected with the display, the input device, and the image sensor, and a non-transitory computer readable storage medium electrically connected with the processor that stores instructions that cause the processor to control the display to display first-level information as a locking mode is partially released when partial authentication passes based on bio-information acquired through the image sensor in a state in which the electronic device is in the locking mode, and control the display to display second-level information having a security level higher than a security level of the first-level information as the locking mode is fully released when full authentication passes based on a user input made through the input device.

8 Claims, 13 Drawing Sheets

(51) Int. Cl.
*G06F 3/048* (2013.01)
*G06F 3/041* (2006.01)
*G06F 21/00* (2013.01)
*G06Q 20/40* (2012.01)
*G07G 1/01* (2006.01)
*G07F 19/00* (2006.01)
*H04L 29/06* (2006.01)
*G06F 21/32* (2013.01)
*H04W 12/06* (2021.01)

(52) U.S. Cl.
CPC .............. *G06F 21/00* (2013.01); *G06F 21/31* (2013.01); *G06F 21/32* (2013.01); *G06Q 20/322* (2013.01); *G06Q 20/3223* (2013.01); *G06Q 20/3274* (2013.01); *G06Q 20/40* (2013.01); *G07F 19/209* (2013.01); *G07G 1/01* (2013.01); *H04L 63/105* (2013.01); *H04W 12/06* (2013.01); *G06F 2221/2113* (2013.01)

(56) References Cited

U.S. PATENT DOCUMENTS

| | | | |
|---|---|---|---|
| 9,288,207 B2 | 3/2016 | Cronin | |
| 9,532,212 B2 | 12/2016 | Huang et al. | |
| 9,679,211 B2 | 6/2017 | Park et al. | |
| 9,819,675 B1 | 11/2017 | Cronin | |
| 10,402,896 B1* | 9/2019 | Lopez | G06Q 40/00 |
| 10,521,610 B1* | 12/2019 | Ledet | H04L 9/3226 |
| 10,803,281 B2* | 10/2020 | Han | G06F 21/32 |
| 2011/0320345 A1* | 12/2011 | Taveau | G06Q 20/3226 |
| | | | 705/39 |
| 2012/0324571 A1 | 12/2012 | Shibata et al. | |
| 2013/0052993 A1 | 2/2013 | Kwon et al. | |
| 2014/0085460 A1 | 3/2014 | Park et al. | |
| 2014/0106711 A1* | 4/2014 | Seo | H04L 63/0861 |
| | | | 455/411 |
| 2014/0283135 A1* | 9/2014 | Shepherd | G06F 3/04817 |
| | | | 726/29 |
| 2014/0344896 A1 | 11/2014 | Pak et al. | |
| 2015/0011190 A1 | 1/2015 | Kwon et al. | |
| 2015/0074615 A1* | 3/2015 | Han | G06F 3/0481 |
| | | | 715/863 |
| 2015/0245210 A1 | 8/2015 | Kwon et al. | |
| 2015/0381792 A1 | 12/2015 | Kwon et al. | |
| 2016/0050209 A1* | 2/2016 | Govande | H04W 12/06 |
| | | | 726/7 |
| 2016/0364600 A1* | 12/2016 | Shah | G06K 9/00087 |
| 2017/0337542 A1 | 11/2017 | Kim et al. | |

FOREIGN PATENT DOCUMENTS

| | | |
|---|---|---|
| CN | 104102862 | 10/2014 |
| CN | 105120047 | 12/2015 |
| CN | 105184567 | 12/2015 |
| CN | 105426745 | 3/2016 |
| CN | 106096346 | 11/2016 |
| CN | 106446631 | 2/2017 |
| EP | 2 495 677 | 9/2012 |
| EP | 2 538 365 | 12/2012 |
| EP | 2 565 809 | 3/2013 |
| JP | 2008-259236 | 10/2008 |
| JP | 2013-186851 | 9/2013 |
| KR | 1020140042316 | 4/2014 |
| KR | 1020160105279 | 9/2016 |
| KR | 1020160105297 | 9/2016 |
| KR | 1020170045944 | 4/2017 |
| KR | 1020170058258 | 5/2017 |
| WO | WO 2014/201647 | 12/2014 |

OTHER PUBLICATIONS

European Search Report dated May 6, 2020 issued in counterpart application No. 18832197.0-1218, 8 pages.
Chinese Office Action dated Aug. 24, 2020 issued in counterpart application No. 201880041916.8, 10 pages.
Chinese Office Action dated Mar. 15, 2021 issued in counterpart application No. 201880041916.8, 7 pages.

* cited by examiner

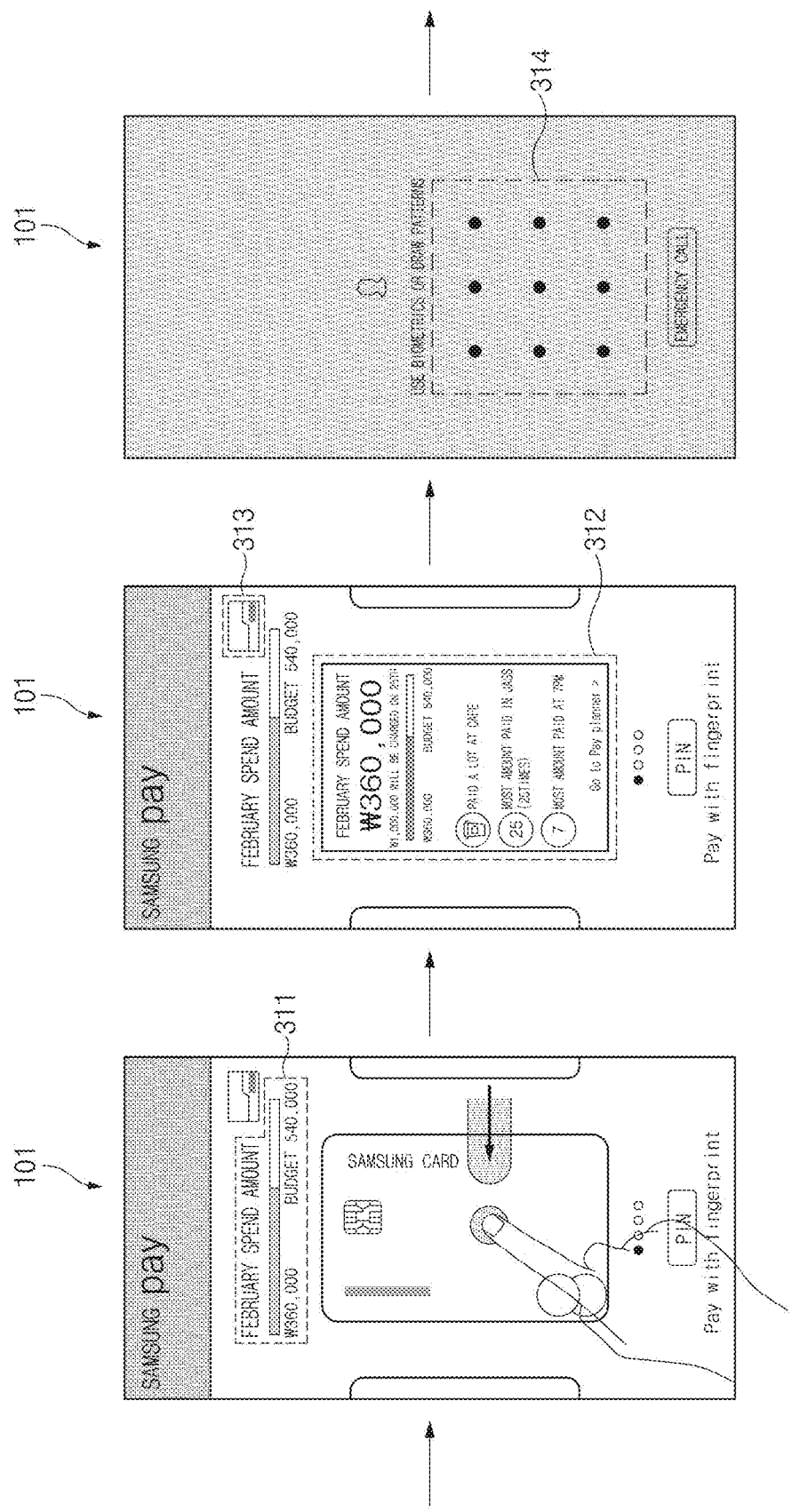

FIG.3G  FIG.3H  FIG.3I

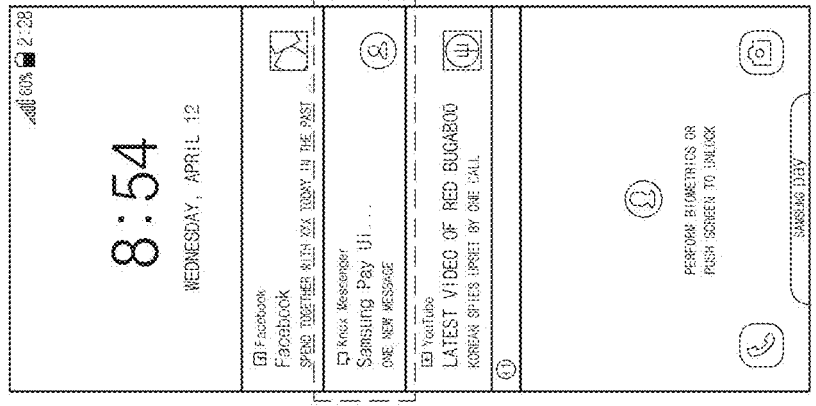
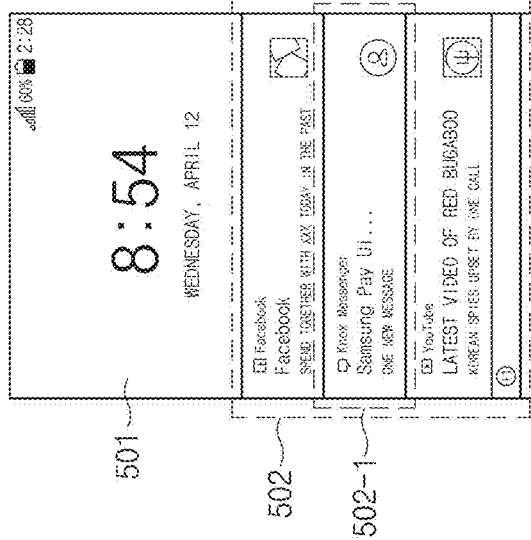
FIG. 5A   FIG. 5B   FIG. 5C

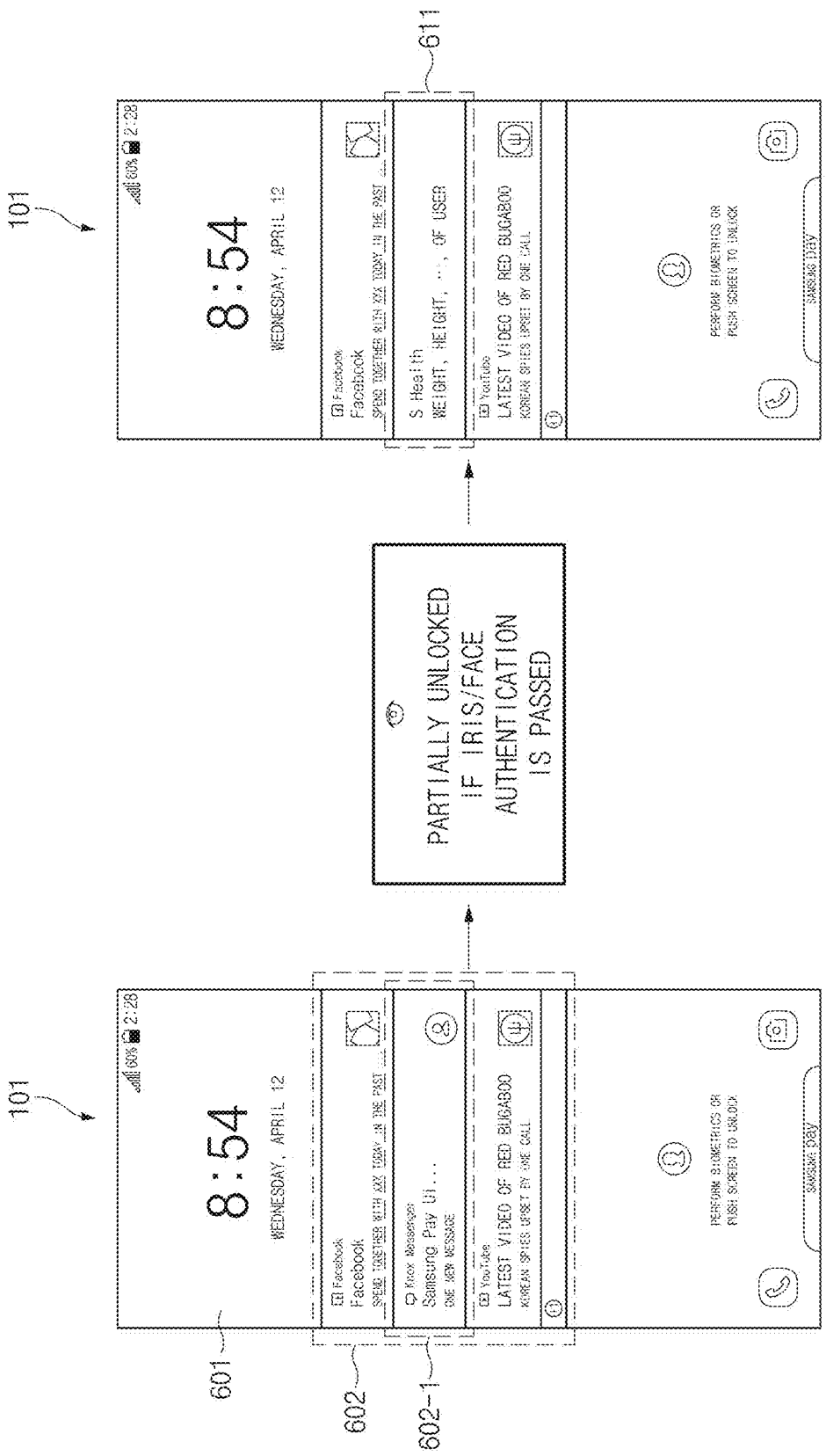

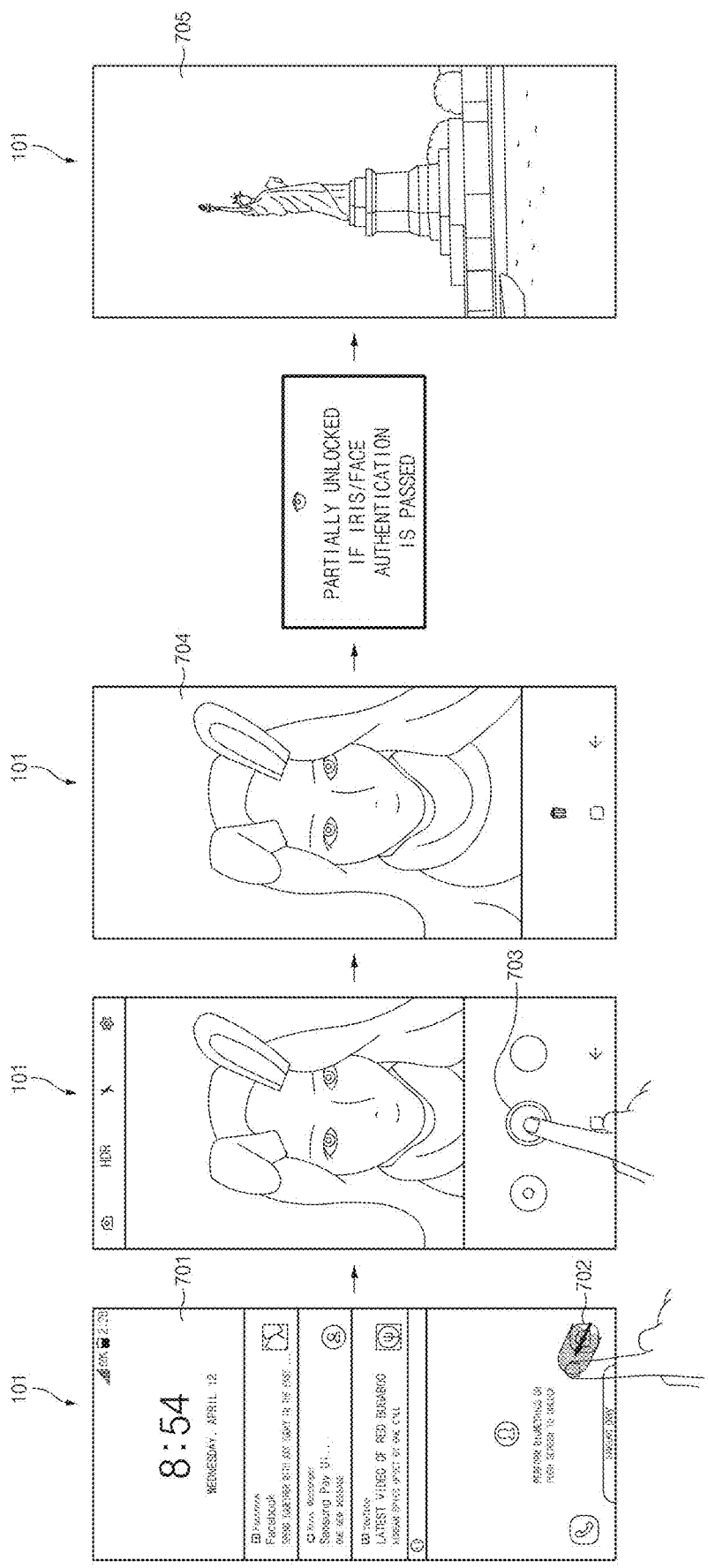

ELECTRONIC DEVICE FOR DISPLAYING INFORMATION AND METHOD THEREOF

CROSS-REFERENCE TO RELATED APPLICATION(S)

This application is based on and claims priority under 35 U.S.C. § 119 to Korean Patent Application Serial No. 10-2017-0089100, filed on Jul. 13, 2017, in the Korean Intellectual Property Office, the entire disclosure of which is incorporated herein by reference.

BACKGROUND

1. Field

The disclosure relates, generally, to an electronic device and a method for displaying information, and more particularly, to an electronic device and a method for displaying information based on user authentication.

2. Description of the Related Art

As information communication and semiconductor technologies are developed, electronic devices have become multimedia devices providing various services, such as broadcast services, wireless Internet services, camera services, and electronic payment services.

When a user purchases an article in a shop, the user may pay for the article by using an electronic card that is registered in the electronic device, instead of a real card (e.g., a credit card) through the electronic payment service.

The user may execute a bookmark function for favorite cards on a locked screen of the electronic device to display electronic cards on the locked screen. In this case, information provided may be limited by the electronic device in a locking mode.

When the electronic device is in the locking mode, the user may need to release the locking mode to receive desired information from the electronic device. Although the electronic device may provide some information in the locking mode, the information provided by the electronic device is significantly limited and personal information may be limited from exposure. Whenever the locking mode needs to be released, the electronic device requires user authentication. Thus, the experience of the user using the electronic device may be interrupted, so the user may experience inconvenience.

SUMMARY

The present disclosure has been made to address at least the disadvantages described above and to provide at least the advantages described below. Accordingly, an aspect of the present disclosure is to provide a method for unlocking an electronic device to overcome the inconvenience of the user and to improve the convenience of the user using the electronic device.

In accordance with an aspect of the present disclosure, an electronic device is provided. The electronic device includes a display configured to display information, an input device configured to receive a user input, an image sensor, a processor electrically connected with the display, the input device, and the image sensor, and a non-transitory computer readable storage medium electrically connected with the processor. The memory stores instructions that, when executed by the electronic device, cause the processor to control the display to display first-level information as a locking mode is partially released when partial authentication passes based on bio-information acquired through the image sensor in a state in which the electronic device is in the locking mode, and control the display to display second-level information having a security level higher than a security level of the first-level information as the locking mode is fully released when full authentication passes based on a user input made through the input device, in the state in which the electronic device is in the locking mode.

In accordance with an aspect of the disclosure, a method is provided. The method includes displaying a locking mode screen representing that the electronic device is in a locking mode, performing partial authentication based on bio-information acquired through an image sensor in the locking mode, displaying first-level information as the locking mode is partially released, when the partial authentication passes, performing full authentication based on a user input made through an input device, in a state in which the locking mode is partially released, and displaying second-level information having a security level higher than a security level of the first-level information as the locking mode is fully released, when the full authentication passes.

In accordance with an aspect of the disclosure, a computer program product is provided. The computer program product includes a non-transitory computer-readable storage medium having instructions that, when executed, cause a processor of an electronic device to perform displaying a locking mode screen representing that the electronic device is in a locking mode, performing partial authentication based on bio-information acquired through an image sensor in the locking mode, displaying first-level information as the locking mode is partially released, when the partial authentication passes, performing full authentication based on a user input made through an input device, in a state in which the locking mode is partially released, and displaying second-level information having a security level higher than a security level of the first-level information as the locking mode is fully released, when the full authentication passes.

BRIEF DESCRIPTION OF THE DRAWINGS

The above and other aspects, features and advantages of certain embodiments of the disclosure will be more apparent from the following detailed description taken in conjunction with the accompanying drawings, in which:

FIGS. 3A, 3B, 3C, 3D, 3E, 3F, 3G, 3H, and 3I are diagrams of execution screens of a payment application as the locking mode is partially released, according to an embodiment;

FIGS. 5A, 5B, 5C, 6A, 6B, and 6C are diagrams of execution screens of a notification application as the locking mode is partially released, according to an embodiment;

FIGS. 7A, 7B, 7C, 7D, and 7E are diagrams of execution screens of a camera application obtained as the locking mode is partially released, according to an embodiment;

DETAILED DESCRIPTION

Figure 1:
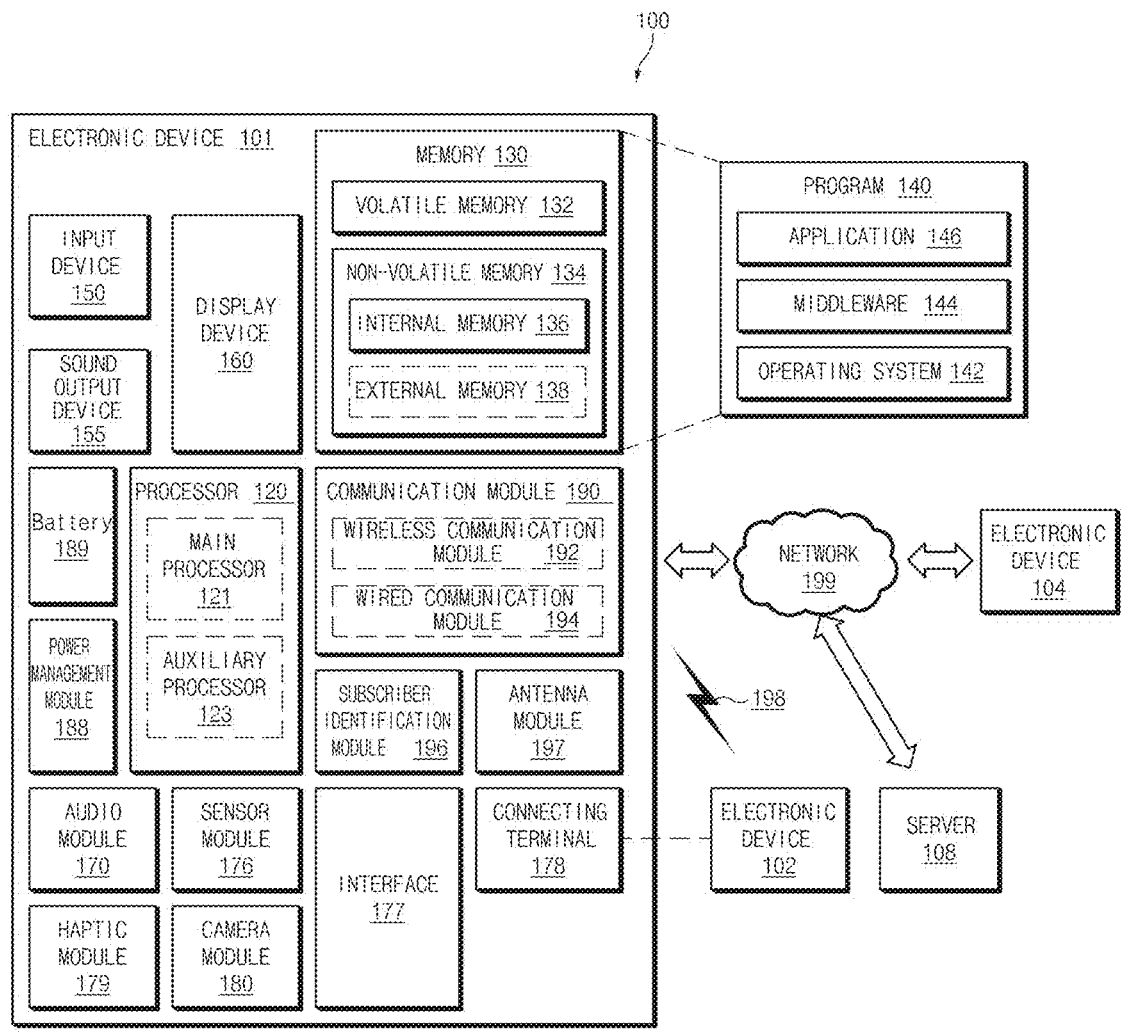
FIG. 1 is a diagram of an electronic device in a network environment, according to an embodiment.

Embodiments of the disclosure will be described herein below with reference to the accompanying drawings. However, the embodiments of the disclosure are not limited to the specific embodiments and should be construed as including all modifications, changes, equivalent devices and methods, and/or alternative embodiments of the present disclosure. In the description of the drawings, similar reference numerals are used for similar elements.

The terms "have," "may have," "include," and "may include" as used herein indicate the presence of corresponding features (for example, elements such as numerical values, functions, operations, or parts), and do not preclude the presence of additional features.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

The terms such as "first" and "second" as used herein may use corresponding components regardless of importance or an order and are used to distinguish a component from another without limiting the components. These terms may be used for the purpose of distinguishing one element from another element. For example, a first user device and a second user device may indicate different user devices regardless of the order or importance. For example, a first element may be referred to as a second element without departing from the scope the disclosure, and similarly, a second element may be referred to as a first element.

It will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element. To the contrary, it will be understood that, when an element (for example, a first element) is "directly coupled with/to" or "directly connected to" another element (for example, a second element), there is no intervening element (for example, a third element) between the element and another element.

The expression "configured to (or set to)" as used herein may be used interchangeably with "suitable for," "having the capacity to," "designed to," "adapted to," "made to," or "capable of" according to a context. The term "configured to (set to)" does not necessarily mean "specifically designed to" in a hardware level. Instead, the expression "apparatus configured to . . . " may mean that the apparatus is "capable of . . . " along with other devices or parts in a certain context. For example, "a processor configured to (set to) perform A, B, and C" may mean a dedicated processor (e.g., an embedded processor) for performing a corresponding operation, or a generic-purpose processor (e.g., a central processing unit (CPU) or an application processor (AP)) capable of performing a corresponding operation by executing one or more software programs stored in a memory device.

The terms used in describing the various embodiments of the disclosure are for the purpose of describing particular embodiments and are not intended to limit the disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. The terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the disclosure.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the disclosure may include at least one of an application-specific integrated circuit (ASIC) chip, a field-programmable gate array (FPGA), and a programmable-logic device for performing operations which has been known or are to be developed hereinafter.

An electronic device according to the disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a MPEG-1 audio layer-3 (MP3) player, a mobile medical device, a camera, and a wearable device. The wearable device may include at least one of an accessory type (e.g., a watch, a ring, a bracelet, an anklet, a necklace, a glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit).

The electronic device may be a home appliance. The home appliance may include at least one of, for example, a television, a digital video disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

The electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment device, an electronic device for a ship (e.g., a navigation device for a ship, and a gyro-compass), avionics, security devices, an automotive head unit, a robot for home or industry, an automatic teller machine (ATM) in banks, point of sales (POS) devices in a shop, or an Internet of things (IoT) device (e.g., a light bulb, various sensors, electric or gas meter, a sprinkler device, a fire alarm, a thermostat, a streetlamp, a toaster, a sporting goods, a hot water tank, a heater, a boiler, etc.).

The electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device may be a combination of one or more of the aforementioned various devices. The electronic device may also be a flexible device. Further, the electronic device is not limited to the aforementioned devices, and may include an electronic device according to the development of new technology.

Hereinafter, an electronic device will be described with reference to the accompanying drawings. In the disclosure, the term "user" may indicate a person using an electronic device or a device (e.g., an artificial intelligence electronic device) using an electronic device.

FIG. 1 is a diagram of an electronic device in a network environment, according to an embodiment.

Referring to FIG. 1, an electronic device 101 may communicate with an electronic device 102 through a first network 198 (e.g., a short-range wireless communication) or may communicate with an electronic device 104 or a server 108 through a second network 199 (e.g., a long-distance wireless communication) in a network environment 100. The electronic device 101 may communicate with the electronic device 104 through the server 108. The electronic device 101 may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module 196, and an antenna module 197. At least one (e.g., the display device 160 or the camera module 180) among components of the electronic device 101 may be omitted or other components may be added to the electronic device 101. Some components may be integrated and implemented as in the case of the sensor module 176 (e.g., a fingerprint sensor, an iris sensor, or an illuminance sensor) embedded in the display device 160 (e.g., a display).

The processor 120 may operate, for example, software (e.g., a program 140) to control at least one of other components (e.g., a hardware or software component) of the electronic device 101 connected to the processor 120 and may process and compute a variety of data. The processor 120 may load a command set or data, which is received from other components (e.g., the sensor module 176 or the communication module 190), into a volatile memory 132, may process the loaded command or data, and may store result data into a nonvolatile memory 134. The processor 120 may include a main processor 121 (e.g., a central processing unit or an application processor) and an co-processor 123 (e.g., a graphic processing device, an image signal processor, a sensor hub processor, or a communication processor (CP)), which operates independently from the main processor 121, additionally or alternatively uses less power than the main processor 121, or is specified to a designated function. In this case, the co-processor 123 may operate separately from the main processor 121 or embedded.

The co-processor 123 may control at least some of functions or states associated with at least one component (e.g., the display device 160, the sensor module 176, or the communication module 190) among the components of the electronic device 101 instead of the main processor 121 while the main processor 121 is in an inactive (e.g., sleep) state or together with the main processor 121 while the main processor 121 is in an active (e.g., an application execution) state. The co-processor 123 (e.g., the image signal processor or the CP) may be implemented as a part of another component (e.g., the camera module 180 or the communication module 190) that is functionally related to the co-processor 123. The memory 130 may store a variety of data used by at least one component (e.g., the processor 120 or the sensor module 176) of the electronic device 101, for example, software (e.g., the program 140) and input data or output data with respect to commands associated with the software. The memory 130 may include the volatile memory 132 or the nonvolatile memory 134.

The program 140 may be stored in the memory 130 as software and may include an operating system 142, a middleware 144, or an application 146.

The input device 150 may be a device for receiving a command or data, which is used for a component (e.g., the processor 120) of the electronic device 101, from an outside (e.g., a user) of the electronic device 101 and may include, for example, a microphone, a mouse, a keyboard, a touch panel (or a touch circuit), a pressure sensor, or the like.

The sound output device 155 may be a device for outputting a sound signal to the outside of the electronic device 101 and may include a speaker used for general purposes, such as multimedia play or recordings play, and a receiver used only for receiving calls. The receiver and the speaker may be either integrally or separately implemented.

The display device 160 may be a device for visually presenting information to the user and may include a display, a hologram device, or a projector and a control circuit for controlling a corresponding device. The display device 160 and a touch panel, which is the input device 150, may be stacked to configure the touch screen.

The audio module 170 may convert a sound and an electrical signal in dual directions. The audio module 170 may obtain the sound through the input device 150 or may output the sound through an external electronic device (e.g., the electronic device 102, a speaker, a headphone, etc.) wired or wirelessly connected to the sound output device 155 or the electronic device 101.

The sensor module 176 may generate an electrical signal or a data value corresponding to an operating state (e.g., power or temperature) inside or an environmental state outside the electronic device 101. The sensor module 176 may include a gesture sensor, a gyro sensor, a barometric pressure sensor, a magnetic sensor, an acceleration sensor, a grip sensor, a proximity sensor, a color sensor, an infrared sensor, a biometric sensor, a temperature sensor, a humidity sensor, or an illuminance sensor.

The interface 177 may support a designated protocol wired or wirelessly connected to the external electronic device 102. The interface 177 may include, for example, a high-definition multimedia interface (HDMI), a universal serial bus (USB) interface, an SD card interface, or an audio interface.

A connection terminal 178 may include a connector that physically connects the electronic device 101 to the external electronic device 102 an HDMI connector, a USB connector, an SD card connector, or an audio connector (e.g., a headphone connector).

The haptic module 179 may convert an electrical signal to a mechanical stimulation (e.g., vibration or movement) or an electrical stimulation perceived by the user through tactile or kinesthetic sensations. The haptic module 179 may include, for example, a motor, a piezoelectric element, or an electric stimulator.

The camera module 180 may shoot a still image or a video image. The camera module 180 may include at least one lens, an imaging sensor, an image signal processor, or a flash.

The power management module 188 may be a module for managing power supplied to the electronic device 101 and may serve as at least a part of a power management integrated circuit (PMIC).

The battery 189 may be a device for supplying power to at least one component of the electronic device 101 and may include a non-rechargeable (primary) battery, a rechargeable (secondary) battery, or a fuel cell.

The communication module 190 may establish a wired or wireless communication channel between the electronic device 101 and the external electronic device (e.g., the electronic device 102, the electronic device 104, or the server 108) and support communication execution through the established communication channel. The communication module 190 may include at least one communication processor operating independently from the processor 120 (e.g., the AP) and supporting the wired communication or the wireless communication. The communication module 190 may include a wireless communication module 192 (e.g., a cellular communication module, a short-range wireless communication module, or a global navigation satellite system (GNSS) communication module) or a wired communication module 194 (e.g., an local area network (LAN) communication module or a power line communication module) and may communicate with the external electronic device using a corresponding communication module among them through the first network 198 (e.g., the short-range communication network such as a Bluetooth, a WiFi direct, or an Infrared Data Association (IrDA) standard network) or the second network 199 (e.g., the long-distance wireless communication network such as a cellular network, an internet, or a computer network (e.g., LAN or WAN)). The above-mentioned various communication modules 190 may be implemented into one chip or into separate chips, respectively.

The wireless communication module 192 may identify and authenticate the electronic device 101 using user information stored in the subscriber identification module 196 in the communication network.

The antenna module 197 may include one or more antennas to transmit or receive the signal to or from an external source. The communication module 190 (e.g., the wireless communication module 192) may transmit or receive the signal to or from the external electronic device through the antenna suitable for the communication method.

Some components among the components may be connected to each other through a communication method (e.g., a bus, a general purpose input/output (GPIO), a serial peripheral interface (SPI), or a mobile industry processor interface (MIPI)) used between peripheral devices to exchange signals (e.g., a command or data) with each other. The command or data may be transmitted or received between the electronic device 101 and the external electronic device 104 through the server 108 connected to the second network 199. Each of the electronic devices 102 and 104 may be the same or different types as or from the electronic device 101. All or some of the operations performed by the electronic device 101 may be performed by another electronic device or a plurality of external electronic devices. When the electronic device 101 performs some functions or services automatically or by request, the electronic device 101 may request the external electronic device to perform at least some of the functions related to the functions or services, in addition to or instead of performing the functions or services by itself. The external electronic device receiving the request may carry out the requested function or the additional function and transmit the result to the electronic device 101. The electronic device 101 may provide the requested functions or services based on the received result as is or after additionally processing the received result. To this end, a cloud computing, distributed computing, or client-server computing technology may be used.

Figure 2A:
FIGS. 2A and 2B are diagrams of procedures of releasing a locking mode of an electronic device, according to an embodiment.
Figure 2B:
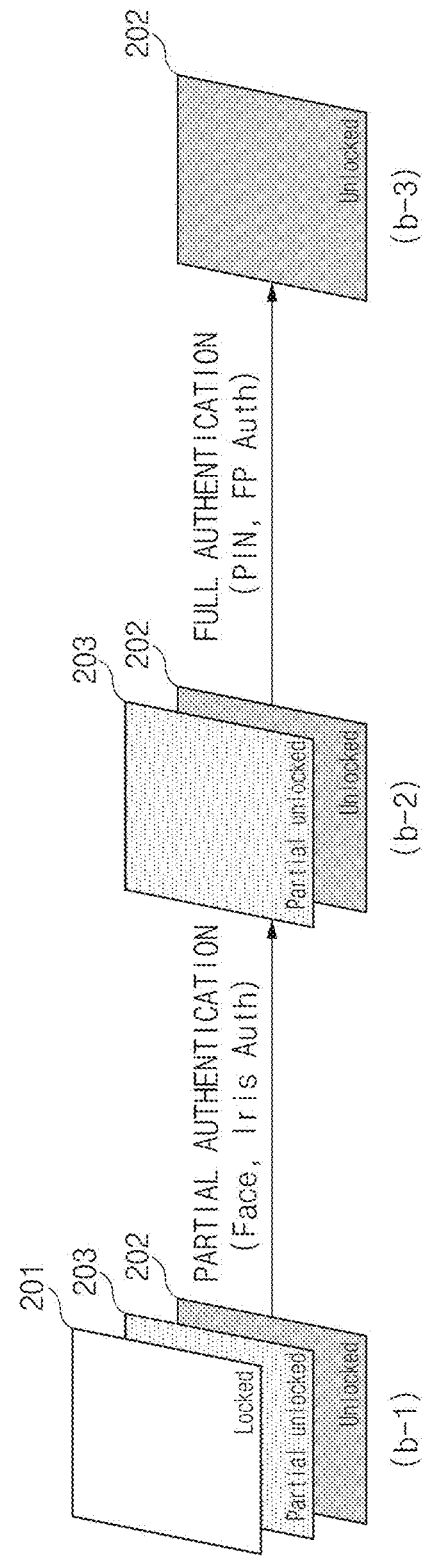

FIGS. 2A and 2B are diagrams of procedures of releasing a locking mode of an electronic device, according to an embodiment. FIG. 2A is a view conceptually illustrating a conventional procedure of releasing a locking mode, and FIG. 2B is a view conceptually illustrating a procedure of releasing a locking mode.

In the case of the conventional procedure of releasing the locking mode, the access to an unlocked screen 202 is interrupted by a locked screen (locking mode screen) 201 as illustrated in reference sign (a-1) of FIG. 2A. Until the locking mode is released, the electronic device 101 may prevent the personal information of the user from being exposed.

Thereafter, when user authentication passes through a pattern input, the input of a PIN password, or fingerprint recognition, the electronic device 101 releases the locking mode and exposes the unlocked screen 202 including the personal information as illustrated in reference sign (a-2) of FIG. 2A.

When the exposure of the personal information is limited due to the locking mode of the electronic device 101, although a security level may be raised, a user may feel that the experience is interrupted. Since the personal information is recognized only when the locking mode is released, the rapid access to the personal information is limited and the user may feel a barrier to locking mode.

As illustrated in FIG. 2B, the concept of partial unlocking is applied to provide the continuous user experience until the personal information is recognized.

As shown in (b-1) of FIG. 2B, the electronic device 101 may apply the concept of a partial unlocked screen 203 between the locked screen 201 and the unlocked screen 202, in the locking mode. The partial releasing of the locking mode may be performed through a partial authentication scheme. The partial authentication scheme may refer to an authentication scheme of automatically partially releasing the locking mode in the situation that the user has no intent to release the locking mode of the electronic device 101. Alternatively, the partial authentication scheme may refer to an authentication scheme of partially releasing the locking mode in advance before receiving an intentional user input for releasing the locking mode of the electronic device 101.

The partial authentication scheme may employ information captured using an image sensor to automatically perform user authentication regardless of the intent of the user. While the user is facing the locked screen 201, the electronic device 101 may acquire bio-information of the user, such as the face information or iris information, by using the image sensor. When the partial authentication passes based on the acquired bio-information, the electronic device 101 may display the partial unlocked screen 203 including first-level information as the locking mode is partially released as shown in reference sign (b-2) of FIG. 2B. The partial authentication scheme may be called a non-contact user authentication scheme in that authentication is performed through a non-touch user input.

When the full authentication passes to fully release the locking mode in the state that the first-level information is displayed, the electronic device 101 may provide the unlocked screen 202 including second-level information having a security level higher than a security level of the first-level information as the locking mode is fully released. A user input for fully releasing the locking mode may include user inputs such as a pattern drawn for releasing the locking mode, a password input (e.g., a number or a character), fingerprint touch input for fingerprint authentication, etc. A user authentication scheme of fully releasing the locking mode may be referred to as a full authentication scheme. In addition, when a user contact is required to fully release the locking mode, the user authentication scheme may be referred to as a contact-based user authentication scheme.

In addition, the second-level information having a security level higher than the security level of the first-level information may include a larger amount of information, additional personal information, additional detailed information, or information requiring stronger access authority, as compared with the first-level information, or may include at least a portion of the first-level information.

Meanwhile, to fully release the locking mode, a user may use a partial authentication scheme as well as a full authentication scheme. For example, the locking mode may be released through iris recognition or face recognition.

FIGS. 3A-3I are diagrams of execution screens of a payment application as the locking mode is partially released, according to an embodiment.

Figures 3A, 3B, 3C:
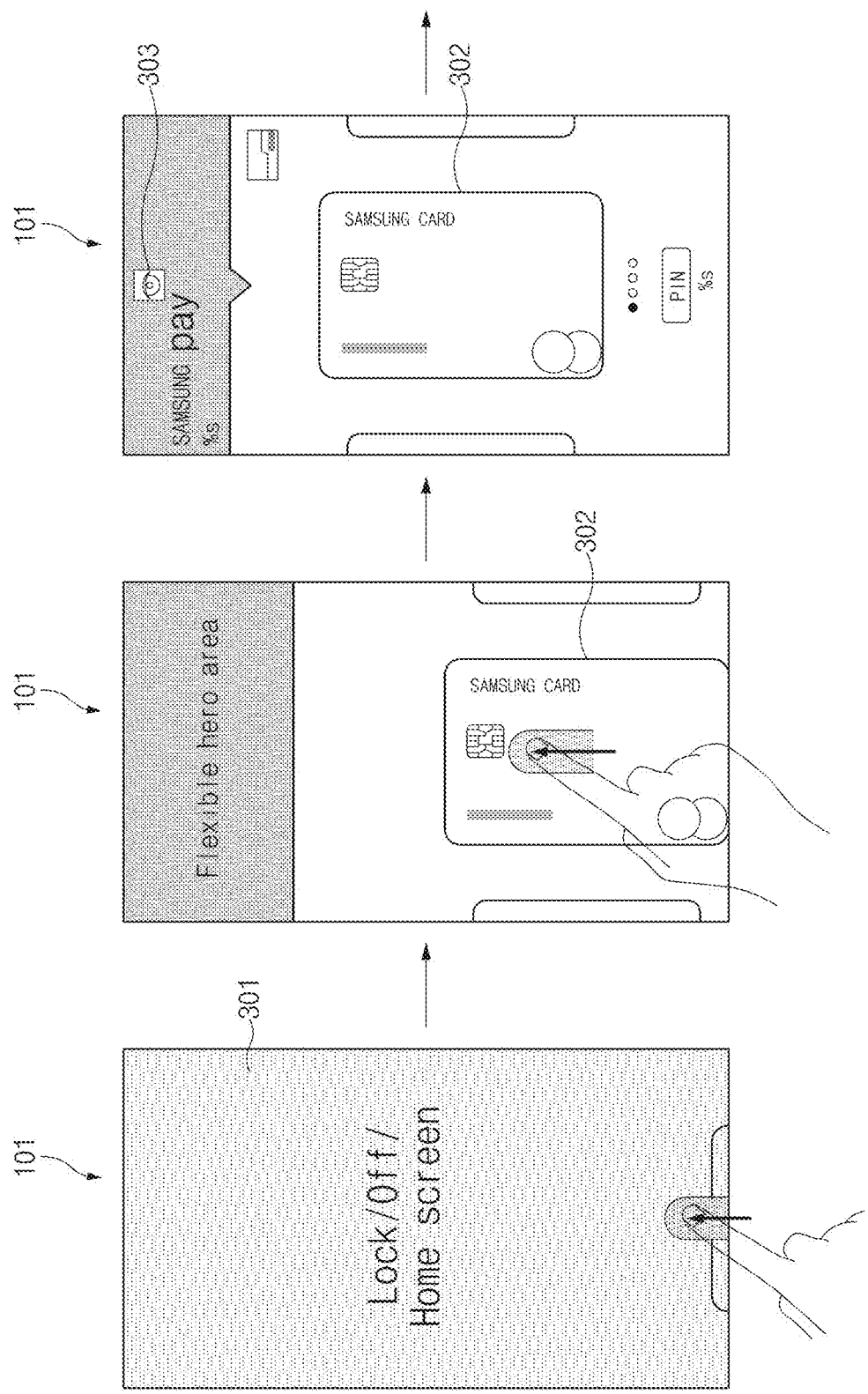

First, in FIG. 3A, the electronic device 101 may provide a locking mode screen 301 as the electronic device 101 is in a locking mode. The locking mode screen 301 may include a user interface for receiving a pattern or a password for unlocking. In the locking mode, the user may make a user input of swiping toward a display from a bezel area provided at a lower end of the electronic device 101 to execute a bookmark function for favorite cards of the payment application.

The electronic device 101 may gradually show one electronic card 302 of cards, which are previously registered in the electronic device 101, from the lower end of the electronic device 101 while displaying the electronic card 302 on a screen, by executing a payment application (e.g., Samsung Pay™) based on the user input in FIG. 3B and FIG. 3C.

The electronic card 302 may include a card for payment, a card for banking, a membership card, and a card for managing personal information. For example, the card for payment may include at least one of a credit card, a bearer prepaid card (e.g., a gift card), a check card, and a debit card.

The electronic device 101 may perform partial authentication. The electronic device 101 may perform the partial authentication when receiving the user input (e.g., a swipe input). In addition, when the locking mode screen 301 is displayed and a predetermined period of time (e.g., one second to three seconds) elapses, the partial authentication may be performed. Further, in FIG. 3B, the electronic device 101 may perform the partial authentication during the state of a transition effect that the electronic card 302 gradually appears or may perform the partial authentication in a standby state of receiving a user input as the electronic card 302 is displayed.

The partial authentication may be performed in background based on bio-information (e.g., face information or iris information) acquired through the image sensor.

Meanwhile, when the partial authentication is in progress or is finished, the electronic device 101 may display visual information such as an indicator (or a cue) 303 in FIG. 3C, on the display. The indicator 303 may include an icon having the shape of an eye to represent that iris recognition is in progress or finished for full authentication, or an icon having the shape of a face to represent that the face recognition is in progress or finished for full authentication.

When the partial authentication passes, in FIG. 3D, the electronic device 101 may display first-level information 311 on the display as the electronic device 101 is partially released from the locking mode. The first-level information 311, which is information on a level which does not require a higher security level, may include at least one of a spend amount this month or last month and a budget for a card. The electronic device 101 may display the first-level information 311 on the execution screen of the first payment application (e.g., Samsung Pay™).

In FIG. 3E, an additional first-level information 312 may be displayed on the display, based on the user input (e.g., a flip or swipe gesture) on the display made in FIG. 3D. The additional first-level information 312 may include lower-level personal information such as a spend amount of a card, an amount to be paid, a budget for the card, and a card benefit to a cardholder. Accordingly, a user may rapidly and clearly recognize the card usage status of himself/herself before making payment, to manage expenses in a smart manner.

Meanwhile, in FIG. 3E, a screen may include a user interface 313 for accessing second-level information having a security level higher than a security level of the first-level information. In FIG. 3F, the electronic device 101 may provide a locking mode screen, which includes a UI 314 for user authentication performed in a touch scheme (e.g., a scheme of inputting a pattern), based on a user input for selecting the UI 313.

In FIG. 3F, when a user input for unlocking is received through the UI 314, the electronic device 101 may perform full authentication based on the received user input. When the full authentication passes, the electronic device 101 may fully release the locking mode and may display second-level information 321 having a security level higher than a security level of the first-level information on the display in FIG. 3G. The second-level information 321 may include, for example, a spend amount of a card, a budget of a card, spend amount for each card, budget for each card, and a spending analysis graph.

The electronic device 101 may display the second-level information 321 on the execution screen of a second application (e.g., Samsung Planner™). The first application to display the first-level information may be identical to the second application to display the second level-information or the first and second applications may be different from each other. The first-level information may be information included in a screen displayed as an execution result of a first function of a specific application. In addition, the second-level information 321 may be information included in a screen displayed as the execution result of the second function of the specific application.

Figures 3G, 3H, 3I:
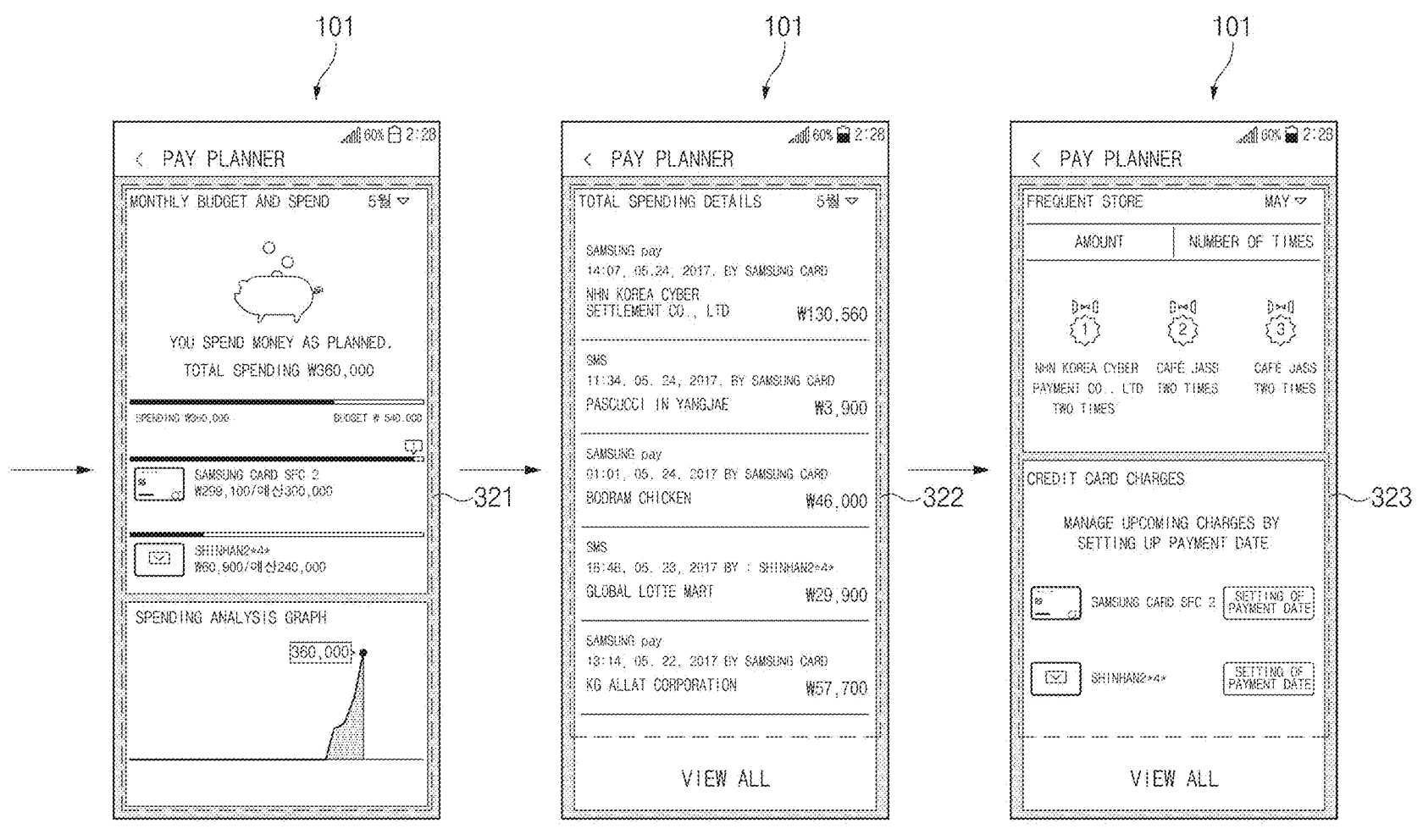

In addition, in FIG. 3H, the electronic device 101 may display second-level information 322 on the display. The second-level information 322 may include expenditure items, or a spend amount for each expenditure item.

In addition, in FIG. 3I, the electronic device 101 may display second-level information 323 on the display. The second-level information 323 may include an UI for spending details for each category, the number of spending times for each category, a card usage frequency for each business, or the setting of a payment date.

The electronic device 101 may sequentially display screens as in FIGS. 3G, 3H, and 3I, based on the user input. The screen in FIG. 3H may be provided based on a flip gesture of a user made on the display having the screen in FIG. 3G, and the screen in FIG. 3I may be provided, based on the flip gesture of the user made on the display in FIG. 3H.

In addition, the second-level information may include a larger amount of information, additional personal information, additional detailed information, or information requiring stronger access authority, as compared with the first-level information, or may include at least a portion of the first-level information.

Figure 4C:
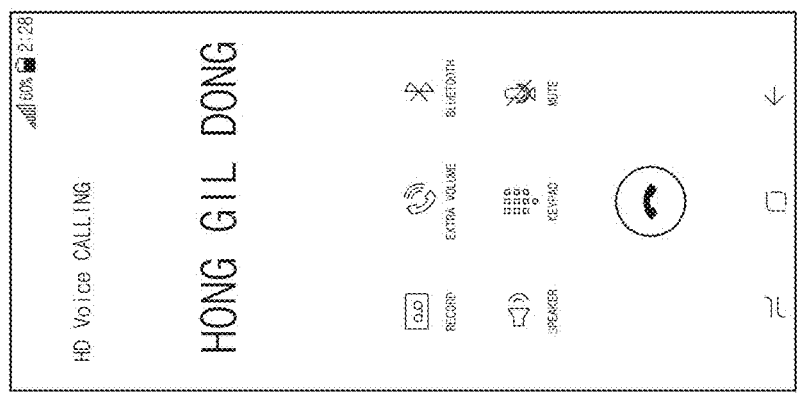
FIGS. 4A, 4B, and 4C are diagrams of execution screens of a voice recognition application as the locking mode is partially released, according to an embodiment.
Figure 4B:
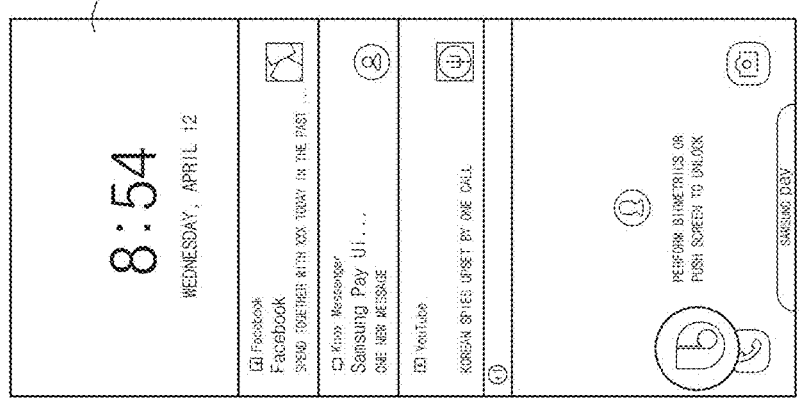
Figure 4A:
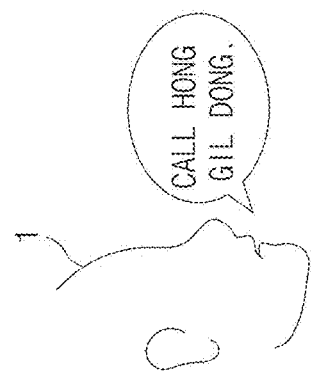

FIGS. 4A-4C are diagrams of the execution screens of a voice recognition application as the locking mode is partially released, according to an embodiment.

First, in FIG. 4A, the electronic device 101 may provide a locking mode screen 401 in a locking mode. The electronic device 101 may recognize a voice of a user 1 uttered through a voice recognition application (e.g., Samsung Bixby™).

The electronic device 101 may perform partial authentication based on the user voice without an additional action of the user, as in FIG. 4B. When the partial authentication passes through iris recognition or face recognition performed for the partial authentication, the electronic device 101 may partially release the locking mode. In addition, the electronic device 101 may perform a first function as the result of the partial releasing of the locking mode as in FIG. 4C. The first function may be a function of determining a recipient according to the result of voice recognition and a function of starting calling a phone number corresponding to the determined recipient.

Meanwhile, when a user intentionally makes a user input for performing unlocking and when user authentication passes based on the user input, the electronic device 101 may fully release the locking mode and may perform a second function. The second function may be a function having a security level higher than a security level of the first function. The second function may be a function more personal than the first function, a function requiring an access authority stronger than that of the first function, or a function of providing a larger amount of information than the first function.

The second function may include a function of providing a list of phone numbers stored in the electronic device 101, providing a conference call, providing a video conference, or displaying a UI accessible to the above functions.

As described above, when the electronic device 101 is controlled by using the voice of the user, whenever a voice command is executed, the electronic device 101 requests unlocking and thus the experience of the user is interrupted. However, the voice command is instantly performed as the partial unlocking is performed and thus the continuous experience of the user is possible.

FIGS. 5A-5C are diagrams of execution screens of a notification application based on partially releasing the locking mode, according to various embodiments.

First, in FIG. 5A, the electronic device 101 may provide a locking mode screen 501. Simple notification information serving as third-level information 502 may be displayed on the locking mode screen 501. The notification information displayed on the locking mode screen 501 may be information, such as the number of messages, an advertisement for each application, an alarm, news, or weather, which is irrelevant to or has lower relationship with personal information.

While the locking mode screen 501 is being displayed, the electronic device 101 may perform the partial authentication as FIG. 5B. The electronic device 101 may determine that a user stares at the display and may perform the partial authentication, in response to a trigger signal (e.g., a signal generated as a user presses a button for turning on the electronic device 101) of activating a black screen, which is the deactivated screen of the electronic device 101, to become the locking mode screen 501. In addition, the electronic device 101 may automatically perform the partial authentication when a specific period (e.g., one second to three seconds) elapses after the locking mode screen 501 is displayed.

When the user authentication passes as iris recognition or face recognition is performed for partial authentication, the electronic device 101 may partially release the locking mode.

When the locking mode is partially released, the electronic device 101 may display first-level information 511 on the display as in FIG. 5C. The first-level information 511 may be information having a security level higher than a security level of the third-level information 502 displayed on the locking mode screen 501. The first-level information 511 may include a larger amount of information, more personal information, more detailed information, or information requiring stronger access authority, as compared with the third-level information, or may include at least a portion of the third-level information 502.

In FIGS. 5A-5C, the first-level information 511 may include, for example, information provided by a messenger application. The first-level information 511 may include detailed information associated with notification information 502-1 included in the third-level information 502. The detailed information may include at least a portion of a body of a message or information on a transmission time of the message.

Meanwhile, when the user makes a user input for fully releasing the locking mode, the electronic device 101 may display second-level information provided by the messenger application when the user authentication passes based on the user input. The second-level information may include an attached file of a message, a carbon copy of the message, another message, a sender of the message, or a full body of the message.

As described above, the locking mode may be automatically partially released without an additional user input for performing unlocking and thus a user may rapidly recognize the content of a message. The content of the message is hidden when another person uses the electronic device 101 and is displayed when the user uses the electronic device 101. Accordingly, the security of the electronic device 101 may be improved.

FIGS. 6A-6C are diagrams of execution screens of a notification application obtained as the locking mode is partially released, according to an embodiment.

First, in FIG. 6A, the electronic device 101 may provide a locking mode screen (601). Notification information (602-1) serving as third-level information 602 may be displayed.

In FIG. 6B, the electronic device 101 may perform partial authentication. The electronic device 101 may perform the partial authentication, in response to a trigger signal or after a specific period elapses as shown in FIG. 6B.

When the partial authentication passes and thus the locking mode is partially released, the electronic device 101 may display first-level information 611 on the display as in FIG. 6C. The first-level information 611 may include information which is not included in the third-level information 602. The first-level information 611 may include new notification information. The new notification information, which is personal information, may include the health information (for example, a user weight, a user height, or a user health state managed through an "S-Health™" app) of the user.

When the number of notification information displayed on the electronic device 101 is limited, the first-level information 611 may be displayed instead of one of multiple pieces of information included in the third-level information 602. The first-level information 611 may be displayed together with the third-level information 602. The number of notification information displayed on the electronic device 101 may be increased. As described above, the spectrum of the notification information displayed on the display may be automatically changed or increased as the locking mode is partially released, so the convenience of the user, who refers to the notification information, may be improved.

FIGS. 7A-7E are diagrams of execution screens of a camera application obtained as the locking mode is partially released, according to an embodiment.

First, in FIG. 7A, the electronic device 101 may receive a user input for selecting a short-cut icon of an application on a locking mode screen 701. The electronic device 101 may receive a user input for selecting a camera icon UI 702 to execute a camera application.

The electronic device 101 may provide the execution screen of the camera application as in FIG. 7B, in response to the user input. Subsequently, when a subject is captured in response to the selection of a user for a shooting UI 703 in FIG. 7B, the electronic device 101 may display an image 704, which is captured, on the display as illustrated in FIG. 7C. When receiving a user input (e.g., a flip gesture made on the display) for requesting for the display of another image which is previously captured, the electronic device 101 may sequentially display captured images in a locking mode.

Meanwhile, when a user input for requesting for the display of another image, which is previously captured, is continuously received but there is absent an image captured in the locking mode, the electronic device 101 may perform partial authentication as in FIG. 7D. The electronic device 101 may perform the partial authentication in advance before the user input is received. The partial authentication may be performed based on an event occurring depending on the selection for the camera UI 702 in FIG. 7A or the shooting UI 703 in FIG. 7B.

The electronic device 101 may partially release the locking mode when the partial authentication passes as iris recognition or face recognition is performed for the partial authentication.

When the locking mode is partially released, the electronic device 101 may continuously display another image 705, which is previously captured before the electronic device 101 enters the locking mode, as first-level information based on the user input, as in FIG. 7E.

Meanwhile, the electronic device 101 may receive a user input for selecting a UI for sharing or editing the displayed photo. The electronic device 101 may display a locking mode screen including a UI allowing the releasing of the locking mode, based on the user input.

When receiving a user input for performing unlocking through the UI allowing the releasing of the locking mode, the electronic device 101 may perform full authentication based on the user input. When the full authentication passes, the electronic device 101 may fully release the locking mode and may provide a screen including at least one UI allowing the sharing or editing of the displayed photo. The second-level information may include a UI representing each sharer and a UI associated with an editing function as the at least one UI allowing the sharing or editing of the displayed photo.

As described above, as some aspects associated with the camera application are automatically partially unlocked without an additional user input for performing the unlocking, a user may naturally view stored photos. Accordingly, the experience of the user using the camera application is not interrupted but continued.

Figure 8:
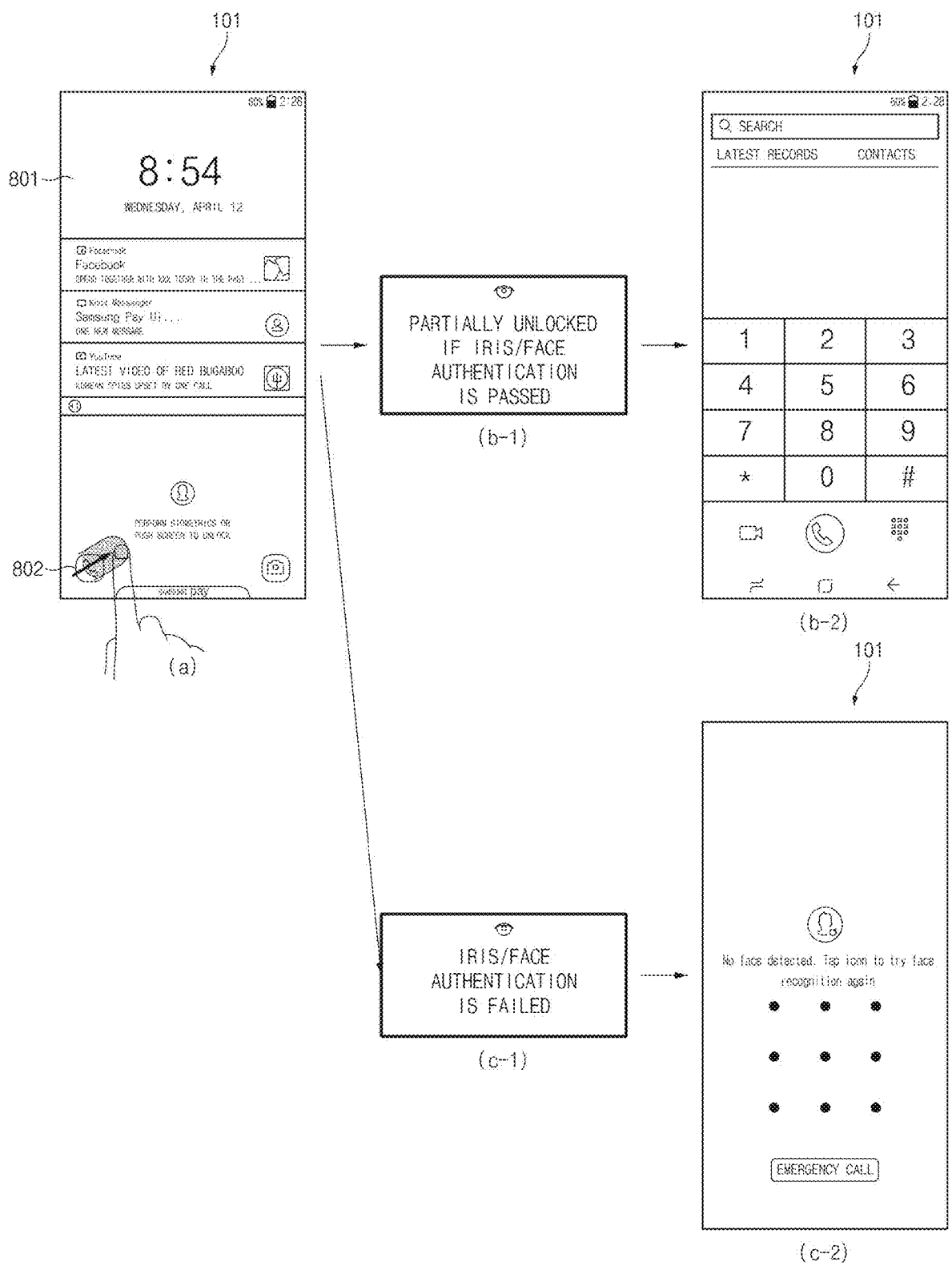
FIG. 8 is a diagram of execution screens of a phone application obtained as the locking mode is partially released, according to an embodiment.

FIG. 8 is a diagram of execution screens of a phone application obtained as the locking mode is partially released, according to various embodiments.

First, as in reference sign (a) of FIG. 8, the electronic device 101 may receive a user input for selecting a phone icon UI 802 as a short-cut icon of an application on a locking mode screen 801.

The electronic device 101 may automatically perform partial authentication as in reference sign (b-1) of FIG. 8, in response to an event occurring based on the user input for selecting the phone icon UI 802. When the partial authentication passes, the electronic device 101 may display an execution screen of the phone application, which includes a UI allowing the input of a phone number, as first-level information.

In contrast, the partial authentication may fail as in in reference sign (c-1) of FIG. 8. The electronic device 101 may display an unlocking screen for requesting for fully releasing the locking mode as in reference sign (c-2) of FIG. 8. When the partial authentication passes based on a user input for fully releasing the locking mode, the electronic device 101 may display the execution screen of the phone application as in reference sign (b-2) of FIG. 8.

When the partial authentication fails, the electronic device 101 may display a screen, which includes the list of emergency phone numbers, as third-level information.

The first-level information, which is information having a security level higher than a security level of the third-level information, may include a larger amount of information, more personal information, more detailed information, or information requiring stronger access authority, as compared with the first-level information, or may include may include at least a portion of the third-level information.

As described above, when a short-cut icon is selected on the locking mode screen, partial unlocking is automatically performed without requesting for an additional user input for unlocking. Accordingly, the experience of the user using the electronic device 101 is not interrupted but naturally continued.

FIGS. 9A-9D are diagrams of screens for settings of a communication network as the locking mode is partially released, according to an embodiment.

Figure 9:
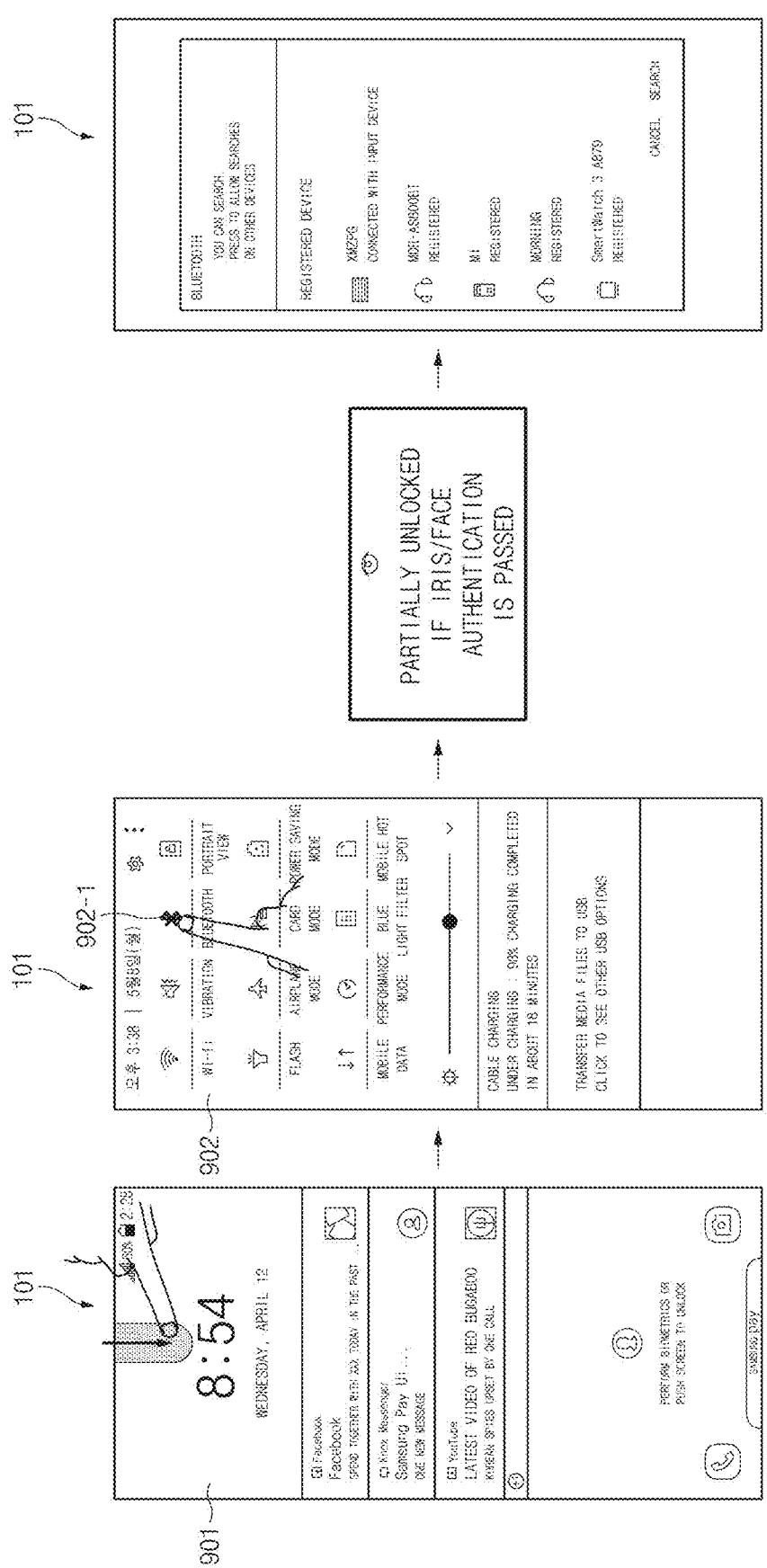
FIGS. 9A, 9B, 9C, and 9D are diagrams of screens for settings of a communication network as the locking mode is partially released, according to an embodiment.

First, in FIG. 9A, the electronic device 101 may receive a user input (e.g., a user input of swiping from a bezel area of an upper end of the electronic device 101 toward a display of the electronic device 101) for displaying a quick panel 902 on a locking mode screen 901.

The electronic device 101 may display the quick panel 902 on the display in FIG. 9B, based on the user input. The quick panel 902 may have a screen including setting UIs for controlling the settings of the electronic device 101. The electronic device 101 may receive a user input for selecting a UI 902-1 among the setting UIs.

The electronic device 101 may perform the partial authentication based on the user input for selecting the UI 902-1 in FIG. 9C. In addition, the electronic device 101 may perform the partial authentication in advance, based on the user input for displaying the quick panel.

When the partial authentication passes, the electronic device 101 may activate a setting function of the electronic device 101, which corresponds to the UI 902-1. The electronic device 101 may establish connection of a communication network (e.g., a short-range wireless communication network such as a Bluetooth network or a Wi-Fi network) as the setting function corresponding to the UI 902-1 is activated. The electronic device 101 may automatically establish a communication network channel with one, which has recently accessed the electronic device 101, of third devices located at a short distance from the electronic device 101 by turning on a Bluetooth network function as the connection of the communication network is established.

In addition, FIG. 9D, the electronic device 101 may display a screen showing a target list for connection, which includes identification information of a third device allowing short-range wireless communication with the electronic device 101. The electronic device 101 may establish a short-range communication connection with a third device corresponding to the selected identification information, based on a user input for selecting one of multiple pieces of identification information included in the target list for connection.

As described above, the electronic device 101 may automatically establish the communication connection with the third device based on the partial unlocking function to naturally provide a user experience for controlling or using the third device.

Figure 10:
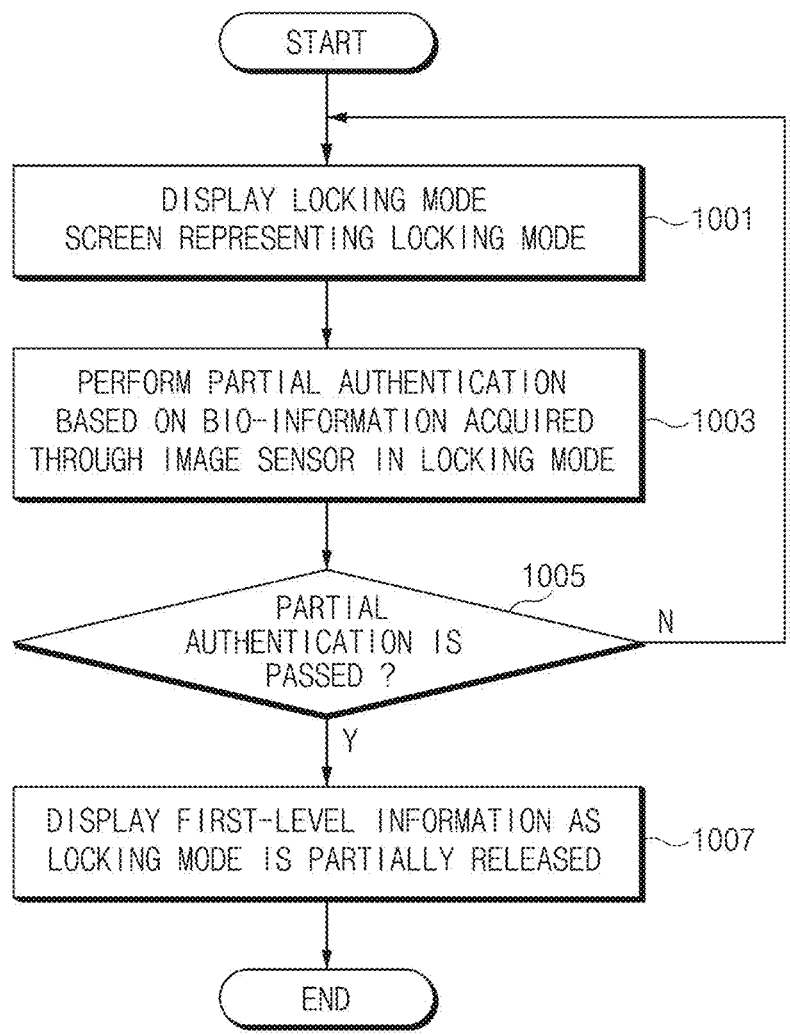
FIGS. 10 and 11 are flowcharts for displaying information by the electronic device, according to an embodiment.

FIG. 10 is a flowchart for displaying information by the electronic device 101, according to an embodiment.

At step 1001, the electronic device 101 may display a locking mode screen representing that the electronic device 101 is in a locking mode.

At step 1003, the electronic device 101 may perform partial authentication based on bio-information obtained through an image sensor in the locking mode.

At step 1005, when the partial authentication passes, the electronic device 101 may display first-level information as the locking mode is partially released at 1007.

In contrast, when the partial authentication fails, the electronic device 101 may continuously display the locking mode screen at step 1001.

Figure 11:
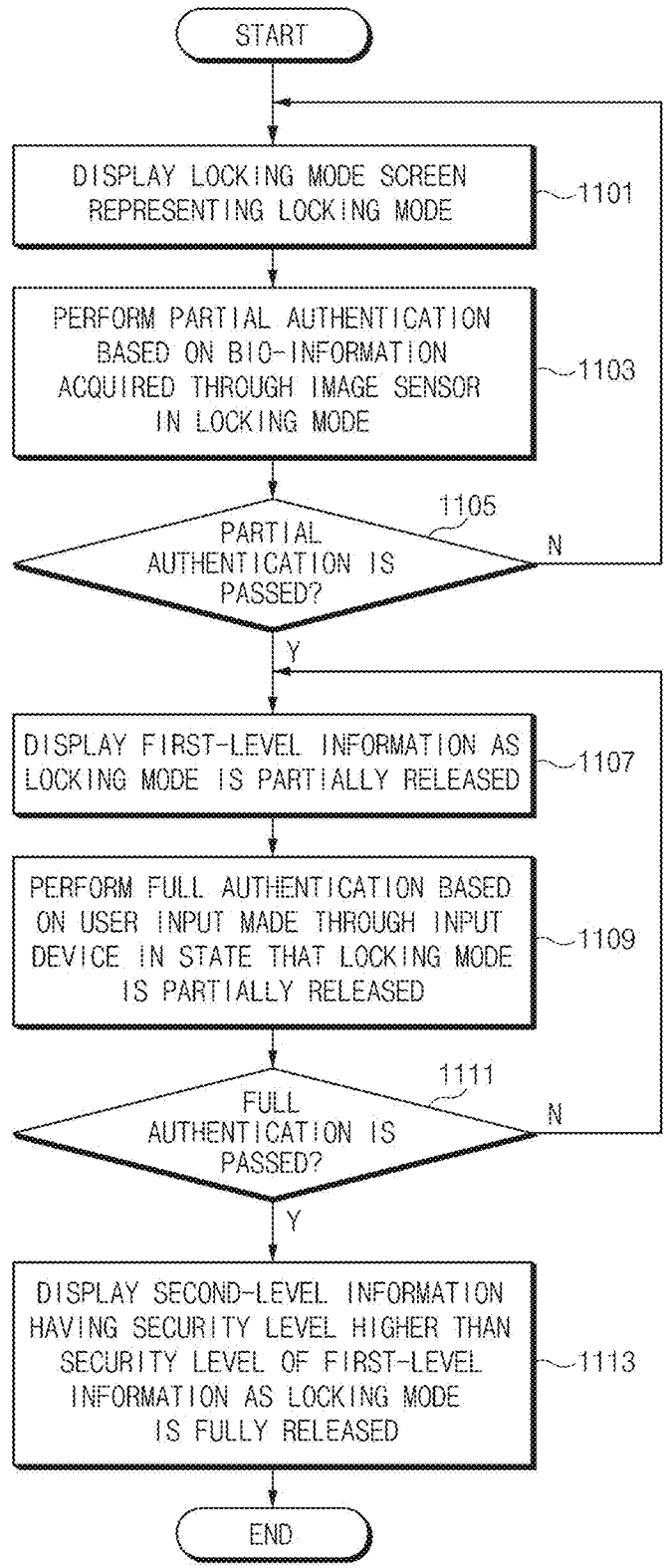

FIG. 11 is a flowchart for displaying information by the electronic device 101, according to an embodiment.

At step 1101, the electronic device 101 may display a locking mode screen representing that the electronic device 101 is in a locking mode.

At step 1103, the electronic device 101 may perform partial authentication based on bio-information obtained through an image sensor in the locking mode.

At step 1105, when the partial authentication passes, the electronic device 101 may display first-level information as the locking mode is partially released at step 1107.

In contrast, when the partial authentication fails, the electronic device 101 may continuously display the locking mode screen at step 1101.

At step 1109, the electronic device 101 may perform full authentication based on a user input through the input device 150 in the state in which the locking mode is partially released.

At step 1111, when the full authentication passes, the electronic device 101 may display second-level information having a security level higher than a security level of the first-level information as the locking mode is fully released at step 1113.

In contrast, when the full authentication fails, the electronic device 101 may continuously display a partial locking mode screen representing that the electronic device 101 is partially released from the locking mode at step 1107. In addition, the electronic device 101 may display a full locking mode screen representing that the electronic device 101 is fully in the locking mode.

According to various embodiments, when the electronic device 101 displays the locking mode screen including third-level information at step 1101, the first-level information at step 1107 may have a security level higher than a security level of the third-level information. For example, when the third-level information is notification information, the first-level information may be detailed information associated with the notification information or new notification information.

In addition, when the electronic device 101 displays a locking mode screen including one UI at 1101 and when the partial authentication passes, the electronic device 101 may display the first-level information based on a user input for selecting one UI. In contrast, when the partial authentication fails, the electronic device 101 may display the third-level information based on the user input for selecting one UI.

Various embodiments of the present disclosure may be implemented by software including an instruction stored in a machine-readable storage media readable by a machine (e.g., a computer). The machine may be a device that calls the instruction from the machine-readable storage media and operates depending on the called instruction and may include the electronic device. When the instruction is executed by the processor, the processor may perform a function corresponding to the instruction directly or using other components under the control of the processor. The instruction may include a code generated or executed by a compiler or an interpreter. The machine-readable storage media may be provided in the form of non-transitory storage media. Here, the term "non-transitory", as used herein, is a limitation of the medium itself (i.e., tangible, not a signal) as opposed to a limitation on data storage persistency.

The method according to various embodiments disclosed in the present disclosure may be provided as a part of a computer program product. The computer program product may be traded between a seller and a buyer as a product. The computer program product may be distributed in the form of machine-readable storage medium (e.g., a compact disc read only memory (CD-ROM)) or may be distributed only through an application store (e.g., a Play Store™). In the case of online distribution, at least a portion of the computer program product may be temporarily stored or generated in a storage medium such as a memory of a manufacturer's server, an application store's server, or a relay server.

Each component (e.g., the module or the program) according to various embodiments may include at least one of the above components, and a portion of the above sub-components may be omitted, or additional other sub-components may be further included. Alternatively or additionally, some components (e.g., the module or the program) may be integrated in one component and may perform the same or similar functions performed by each corresponding components prior to the integration. Operations performed by a module, a programming, or other components according to various embodiments of the present disclosure may be executed sequentially, in parallel, repeatedly, or in a heuristic method. Also, at least some operations may be executed in different sequences, omitted, or other operations may be added.

According to an embodiment, an electronic device may include a housing, a display exposed to one surface of the housing, the input device provided integrally to the display, mounted in the housing, or wirelessly connected with the electronic device, and an image sensor which converts an optical signal for a subject positioned outside the electronic device into an electrical signal. At least a portion of the image sensor may be provided inside the housing of the electronic device or mounted in the housing of the electronic device. In addition, an external device having an image sensor may be wirelessly connected with the electronic device.

The electronic device may include the processor electrically connected with the display, the image sensor, and the input device, and the non-transitory computer readable storage medium electrically connected with the processor.

According to an embodiment, a non-transitory computer readable storage medium may store instructions that, when executed, cause the processor to control the display to display first-level information as a locking mode is partially released, when partial authentication passes based on bio-information obtained through the image sensor in the state that the electronic device is in the locking mode, and causing the processor to control the display to display second-level information having a security level higher than a security level of the first-level information as the locking mode is fully released, when full authentication passes based on a user input made through the input device, in the state that the electronic device is in the locking mode.

The second-level information may include an additional amount of information, additional personal information, more detailed information, or information requiring stronger access authority, as compared with the first-level information, or may include at least a portion of the first-level information. When an application providing the first-level information and the second-level information is a payment application, the first-level information may include at least one of a spend amount of a card, an amount to be paid, a budget for the card, and a card benefit to a cardholder, and the second-level information may include at least one of a spend amount for each card, a budget of the card, a spending analysis graph, and spending details based on categories.

In addition, the partial authentication may be authentication based on face information or iris information of a user which is acquired through the image sensor.

Further, the full authentication may be authentication based on a user input of a pattern drawn on the display for unlocking, a user input of a password input with the input device for unlocking, or a user input of a fingerprint for fingerprint recognition.

In addition, the first-level information may be displayed on an execution screen of a first application and the second-level information may be displayed on an execution screen of a second application different from the first application.

Further, the executed instructions may cause the processor to control the display to display third-level information in the locking mode, and causing the processor to control the display to display the first-level information having a security level higher than a security level of the third-level information, when the partial authentication passes. In this case, when the third-level information is notification information, the memory stores instructions to control the display to display detailed information associated with the notification information or new notification information which serves as the first-level information, when the partial authentication passes.

In addition, the executed instructions may cause the processor to control the display to display an image previously captured in the locking mode, and causing the processor to control the display to display an image, which is captured before entering the locking mode, as the first-level information, when the partial authentication passes.

Further, the executed instructions may cause the processor to control the display to display one user interface (UI) in the locking mode, causing the processor to control the display to display the first-level information, based on a user input for selecting one UI when the partial authentication passes and causing the processor to control the display to display the third-level information, based on the user input for selecting one UI when the partial authentication fails.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

What is claimed is:

1. An electronic device comprising:
a touch screen display configured to display information;
an image sensor;
a processor electrically connected with the touch screen display and the image sensor; and
a memory electrically connected with the processor,
wherein the memory stores instructions that, when executed by the electronic device, cause the processor to:
control the touch screen display to display a first user interface including a first notification indicating that a new message is received in a locked mode,
perform a non-contact partial authentication using bio-information acquired through the image sensor in the locked mode,
control the display to display first-level information of the new message by changing the first notification to the first-level information while maintaining the first user interface as the locked mode is partially released when the non-contact partial authentication passes, the first-level information includes partial content of the new message,
perform a full authentication using a touch input acquired through the touch screen display in the locked mode, and
control the display to display second-level information having a security level higher than a security level of the first-level information as the locked mode is fully released when the full authentication passes, the second-level information includes full content of the new message.

2. The electronic device of claim 1, wherein the second-level information further includes:
an additional amount of information, additional personal information, additional detailed information, or information requiring stronger access authority, as compared with the first-level information; and
at least a portion of the first-level information.

3. The electronic device of claim 1, wherein the partial authentication is based on face information or iris information of a user acquired through the image sensor.

4. The electronic device of claim 1, wherein the full authentication is based on a user input of a pattern drawn on the touch screen display for unlocking, a user input of a password input with the touch screen display for unlocking, or a user input of a fingerprint for fingerprint recognition on the touch screen display.

5. A method for displaying information of an electronic device, the method comprising:
   displaying a locked mode screen representing that the electronic device is in a locked mode;
   displaying a first notification on the locked mode screen, the first notification indicating that a new message is received in the locked mode;
   performing non-contact partial authentication based on bio-information acquired as a non-touch user input through an image sensor in the locking mode;
   displaying first-level information of the new message by changing the first notification to the first-level information while displaying the locked mode screen as the locked mode is partially released, when the non-contact partial authentication passes, the first-level information includes partial content of the new message;
   performing full authentication based on a touch input acquired through a touch screen display, in a state in which the locked mode is partially released; and
   displaying second-level information having a security level higher than a security level of the first-level information as the locked mode is fully released, when the full authentication passes, the second-level information includes full content of the new message.

6. The method of claim 5, wherein the second-level information further includes:
   an additional amount of information, additional personal information, additional detailed information, or information requiring stronger access authority, as compared with the first-level information; and
   at least a portion of the first-level information.

7. The method of claim 5, wherein the partial authentication is based on face information or iris information of a user, which is acquired through the image sensor.

8. The method of claim 5, wherein the full authentication is based on a user input of a pattern drawn on the touch screen display for unlocking, a user input of a password input on the touch screen display for unlocking, or a user input of a fingerprint on the touch screen display for fingerprint recognition.

* * * * *